(12) United States Patent
Nelson et al.

(10) Patent No.: US 7,994,106 B2
(45) Date of Patent: Aug. 9, 2011

(54) WATER SOLUBLE ROSIN ACID ESTERS

(75) Inventors: Lloyd A. Nelson, Savannah, GA (US);
H. Jerrold Miller, Savannah, GA (US)

(73) Assignee: Arizona Chemical Company, LLC, Jacksonville, FL (US)

( * ) Notice: Subject to any disclaimer, the term of this patent is extended or adjusted under 35 U.S.C. 154(b) by 0 days.

(21) Appl. No.: 11/746,148

(22) Filed: May 9, 2007

(65) Prior Publication Data

US 2008/0020957 A1    Jan. 24, 2008

Related U.S. Application Data (60) Provisional application No. 60/799,165, filed on May 9, 2006.

(51) Int. Cl.
*C10M 159/12* (2006.01)
*C10M 129/74* (2006.01)
*C10M 129/95* (2006.01)

(52) U.S. Cl. .......................... 508/449; 524/798; 527/604

(58) Field of Classification Search .................. 508/449; 524/798; 527/604
See application file for complete search history.

(56) References Cited

U.S. PATENT DOCUMENTS

| | | | | |
|---|---|---|---|---|
| 2,412,720 | A * | 12/1946 | Dolman | 514/769 |
| 2,770,598 | A * | 11/1956 | Jezl | 508/318 |
| 3,141,897 | A * | 7/1964 | Brunelle et al. | 554/172 |
| 4,092,283 | A * | 5/1978 | Oishi et al. | 527/600 |
| 4,260,550 | A * | 4/1981 | Armstrong et al. | 560/6 |
| 4,474,669 | A * | 10/1984 | Lewis et al. | 508/117 |
| 4,643,848 | A * | 2/1987 | Thomas et al. | 530/213 |
| 4,751,025 | A * | 6/1988 | Olechowski et al. | 530/214 |
| 5,166,258 | A * | 11/1992 | Boswell et al. | 524/576 |
| 6,274,657 | B1 | 8/2001 | Geoghegan et al. | |
| 2003/0211949 | A1 * | 11/2003 | Guyomar et al. | 508/110 |
| 2005/0197255 | A1 | 9/2005 | Otto et al. | |

\* cited by examiner

*Primary Examiner* — Ellen McAvoy
*Assistant Examiner* — Pamela Weiss (57) ABSTRACT

The present invention relates to a rosin acid ester and compositions containing the same, as well as methods of making and using the same.

18 Claims, 3 Drawing Sheets

WATER SOLUBLE ROSIN ACID ESTERS

RELATED APPLICATION DATA

This application claims priority of U.S. Provisional Patent Application No. 60/799,165, filed May 9, 2006, the specification of which is herein incorporated by reference.

FIELD OF THE INVENTION

The present invention relates to a rosin acid ester and compositions containing the same, as well as methods of making and using the same.

BACKGROUND OF THE INVENTION

Conventional lubricants useful in synthetic, semi-synthetic, and soluble oil-containing formulations, such as those useful in the field of metal working, are very insoluble in water. For example, such conventional lubricants are only soluble in formulations containing up to about 20 wt % water. Once the amount of water in the formulation increases beyond this point, the load properties at a given torque for formulations containing conventional lubricants is very much compromised. "Load carrying" is a characteristic used in the related technical field and, for example, can be measured according to an industrial-acceptable standard such as ASTM 3233. The "load carrying" properties of the formulation are dependent, in part, on the level of solubility the conventional lubricants have in water. Conventional lubricants, therefore, must compromise their water solubility to maintain good load carrying properties when utilized in any of the above-mentioned oil-containing formulations.

It is therefore desirable to provide a formulation that contains a lubricant having enhanced water solubility, while maintaining excellent load carrying properties when used in oil-containing formulations.

SUMMARY OF THE INVENTION

According to one embodiment of the present invention there is provided a rosin acid ester that is a reaction product of contacting at least one rosin-containing composition with at least one α, β-unsaturated carboxylic acid or ester thereof to form an adduct thereof; and at least one alcohol-containing compound to produce the rosin acid ester.

According to another embodiment of the present invention, there is provided an oil-containing composition comprising a rosin acid ester as described above and an oil.

According to yet another embodiment of the present invention, there is provided a composition comprising, s rosin acid ester made by the process of comprising; contacting not more than 48 wt % of at least adduct of a rosin compound with at least 52 wt % of an α,β-unsaturated carboxylic acid with at least one alcohol-containing compound to produce the rosin acid ester to produce a rosin acid ester having an acid value that is not greater than 50.

DETAILED DESCRIPTION OF THE INVENTION

This application is related to the fields of chemistry and polymer science which is described, for example, in Kirk-Othmer "Encyclopedia of Chemical Technology", fourth edition (1996), John Wiley & Sons, which is hereby incorporated, in its entirety, herein by reference.

The inventors have surprisingly found a composition that is relatively low cost and environmental friendly for use as a lubricant in oil-containing formulations, preferably useful in metal-working formulations. This composition is relatively higher in its solubility in water. Further, when used as a lubricant in oil-containing formulations, preferably useful in metal-working formulations, it provides for excellent load carrying properties within a wide range of torques.

The present invention relates to a rosin acid ester. Preferably, the rosin acid ester is soluble in greater than about 20 wt %, more preferably greater than about 30 wt %, most preferably greater than about 40 wt % of water based upon the total weight of the composition. The amount of water in the composition may be about 20, 25, 30, 35, 40, 45, 50, 55, 60, 65, 70, 75, 80, 85, 90, 95, and 99 wt % based upon the total weight of the composition, including any and all ranges and subranges therein.

In addition, the rosin acid ester of the present invention is soluble in a composition when the water and ester are present in a weight ratio that is greater than about 1/4, preferably greater than 1/3, more preferably greater than about 1/2, and most preferably greater than about 1/1. The weight ratio of water and ester may be about 1/4, 1/3, 1/2, 1/1, 2/1, 3/1, 4/1, 5/1, 6/1, 7/1, 8/1, 9/1, and 10/1, including any and all ranges and subranges therein.

The present invention also relates to a composition that is an ester-containing composition, preferably a rosin acid ester and/or a composition containing the same. The ester-containing composition is the reaction product of a two-reaction process, although both reactions may be performed simultaneously in one step and/or serially in multiple steps. In the first reaction, at least one rosin acid-containing composition is reacted with at least one α,β-unsaturated carboxylic acid or ester thereof to form an intermediate composition containing an adduct therebetween rosin acid and α,β-unsaturated carboxylic acid or ester thereof. Subsequently, the intermediate composition containing the adduct is reacted with an alcohol-containing compound to produce the composition of the present invention. The resultant ester-containing composition is and/or contains at least one rosin acid ester of the present invention.

The rosin acid-containing composition may be any rosin-acid containing composition. Preferably, the rosin acid containing composition comprises biomass and/or byproducts thereof. Thus, the rosin acid-containing composition is a renewable resource.

Biomass products, such as those byproducts of refining and processes taking advantage of natural sources are usually low cost. Examples of a biomass product may be the byproducts of paper making from trees. Accordingly, biomass products, such as those similar to black liquor solids, soaps, skimmings, as well as tall oil products such as pitch and/or distillate products thereof are examples of such biomass products. Further, such biomass products are predominantly environment friendly, especially compared to those traditional antifoaming agents utilized it the above-mentioned mining and/or refining processes.

The rosin acid-containing composition contains at least one rosin acid compound. The rosin acid compound may be selected from those natural resin-based acids, such as those obtained from residues of distillation of natural oils. The rosin acid compound may also be derived. Since the rosin compound is an acid, the derivative may be any commonly known derivative of a carbonyl-containing compound known in general Organic Chemistry Textbooks, such as "Organic Chemistry", 5th Edition, by Leroy G. Wade. Examples of such derivatives include, but are not limited to esters, amine carboxylates, and nitrile derivative of the rosin acid compound.

The rosin acids may include those that may be isolated from black liquor skimmings, crude tall oil, tall oil pitch, and distilled tall oil. In addition rosin acids may be those found in tall oil rosin, gum rosin and wood rosin. These naturally occurring rosins may be suitably mixtures and/or isomers of monocarboxylic tricyclic rosin acids usually containing about 20 carbon atoms. The tricyclic rosin acids differ mainly in the position of the double bonds. The rosin acid may be at least one of levopimaric acid, neoabietic acid, palustric acid, abietic acid, dehydroabietic acid, seco-dehydroabietic acid, tetrahydroabietic acid, dihydroabietic acid, pimaric acid, paulstric acid, and isopimaric acid, or mixtures, isomers, and/or derivatives thereof. The rosins derived from natural sources also include rosins, i.e. rosin mixtures, modified notably by polymerisation, isomerisation, disproportionation and hydrogenation. The rosin acids may include those mentioned in U.S. Pat. Nos. 6,900,274; 6,875,842; 6,846,941; 6,344,573; 6,414,111; 4,519,952; and 6,623,554, which are all hereby incorporated, in their entirety, herein by reference.

The rosin acid-containing composition contains from 0.1 to 100 wt % of at least one rosin acid compound selected from the group consisting of natural resin-based acids obtained from residues of distillation of natural oils, amine carboxylates and ester and nitrile compounds of these acids based upon the total weight of the composition. Preferably, the rosin acid-containing composition contains greater than about 50 wt %, more preferably greater than 60 wt %, most preferably greater than 70 wt % of at least one rosin acid compound based upon the total weight of the composition. The amount of the at least one rosin acid compound may be 40, 45, 50, 55, 60, 65, 70, 75, 80, 85, 90, 95, and 100 wt % based upon the total weight of the composition.

The amount of rosin acid compound selected from the group consisting of natural resin-based acids obtained from residues of distillation of natural oils, amine carboxylates and ester and nitrile compounds of these acids present in the composition may be 0.1, 0.2, 0.3, 0.5, 1.0, 1.5, 2.0, 3.0, 4.0, 5.0, 10, 15, 20, 25, 30, 35, 40, 45, 50, 55, 60, 65, 70, 75, 80, 85, 90, 95, 96, 97, 98, 99, 99.1, 99.2, 99.3, 99.4, 99.5, 99.6, 99.7, 99.8, and 99.9 wt % based upon the total weight of the composition, including any and all ranges and subranges therein.

The rosin acid-containing composition may contain at least one unsaponifiable material. Examples of unsaponifiable materials is found, but not limited to, those described in U.S. Pat. Nos. 6,465,665; 6,462,210; and 6,297,353 which are hereby incorporated, in their entirety, herein by reference. Unsaponifiable material may be any neutral material that is not capable of being saponified, or ester thereof.

Examples of the unsaponifiable components include, but are not limited to, tocopherols, tocotrienols, carotenoids, vitamin A, vitamin K, vitamin D, lipoproteins, cholesterol, provitamins, growth factors, flavonoids, sterols, stilbenes, squalane, oryzanol and lycopene. Unsaponifiable material may include those mentioned in U.S. Pat. Nos. 6,875,842; 6,846,941; 6,344,573; 6,414,111; 4,519,952; and 6,623,554, which are hereby incorporated, in their entirety, herein by reference.

Further examples of such unsaponifiable materials are those found in plants, such as woody plants, preferably trees. Examples of such include, but are not limited to sterols, stanols, polycosanols, 3,5-sitostadiene-3-ona, 4-stigmasten-3-ona, α- and/or β-sitosterols, α- and/or β sitostanols, Campestanol, Campesterol, Cycloartenol, Docosanol, Eicosanol, Ergosterol, Escualene, Fatty alcohol esters, Sterol esters, Hexacosanol, Methylencycloartenol, Pimaral, Pimarol, Stigmasta-3-ona, Tetracosanol, etc.

The rosin acid-containing composition may contain not more than 75 wt % of unsaponifiable material based upon the total weight of the composition. Preferably, the rosin acid-containing composition may contain less than about 50 wt %, more preferably less than about 25 wt %, most preferably less than about 10 wt % of unsaponifiable material based upon the total weight of the composition. The amount of unsaponifiable material present in the rosin acid-containing composition may be 0.1, 0.2, 0.3, 0.5, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, and 10.0 wt % based upon the total weight of the composition, including any and all ranges and subranges therein.

The rosin acid-containing composition may contain at least one saturated or unsaturated, monocarboxylic aliphatic hydrocarbon. The saturated or unsaturated, monocarboxylic aliphatic hydrocarbon may have from 5 to 30 carbon atoms, preferably from 8 to 24 carbon atoms. The hydrocarbon may have 5, 6, 7, 8, 9, 10, 11, 12, 13, 14, 15, 16, 17, 18, 19, 20, 21, 22, 23, 24, 25, 26, 27, 28, 29, and 30 carbon atoms, including any and all ranges and subranges therein.

The rosin acid-containing composition may contain at least one saturated or unsaturated, monocarboxylic aliphatic hydrocarbon or derivative thereof. Since the hydrocarbon is monocarboxylic, the derivative may be any commonly known derivative of a carbonyl-containing compound known in general Organic Chemistry Textbooks, such as "Organic Chemistry", 5th Edition, by Leroy G. Wade, which is which is hereby incorporated, in its entirety, herein by reference.

Examples of derivatives of the saturated or unsaturated, monocarboxylic aliphatic hydrocarbon may be an ester, nitrile, or amine carboxylate thereof, as well as those commonly found in black liquor solids, soaps, skimmings, as well as tall oil products such as pitch and/or distillate products thereof. Again, the saturated or unsaturated, monocarboxylic aliphatic hydrocarbon may have from 5 to 30 carbon atoms, preferably from 8 to 24 carbon atoms. The hydrocarbon may have 5, 6, 7, 8, 9, 10, 11, 12, 13, 14, 15, 16, 17, 18, 19, 20, 21, 22, 23, 24, 25, 26, 27, 28, 29, and 30 carbon atoms, including any and all ranges and subranges therein.

The rosin acid-containing composition may contain at least one saturated or unsaturated, monocarboxylic aliphatic hydrocarbon or derivative thereof having a linear, branched, and/or cyclic chain. Again, the saturated or unsaturated, monocarboxylic aliphatic hydrocarbon may have from 5 to 30 carbon atoms, preferably from 8 to 24 carbon atoms. The hydrocarbon may have 5, 6, 7, 8, 9, 10, 11, 12, 13, 14, 15, 16, 17, 18, 19, 20, 21, 22, 23, 24, 25, 26, 27, 28, 29, and 30 carbon atoms, including any and all ranges and subranges therein.

The rosin acid-containing composition may contain at least one saturated or unsaturated, monocarboxylic aliphatic hydrocarbon or derivative thereof having a linear, branched, and/or cyclic chain, a dimer thereof, a trimer thereof, or mixtures thereof. The rosin-containing composition may contain less than about 75 wt % saturated or unsaturated, monocarboxylic aliphatic hydrocarbon or derivative thereof having a linear, branched, and/or cyclic chain, a dimer thereof, a trimer thereof, or mixtures thereof based upon the total weight of the composition. Preferably, the rosin acid-containing composition may contain less than about 50 wt %, more preferably less than about 25 wt %, most preferably, less than about 10 wt % saturated or unsaturated, monocarboxylic aliphatic hydrocarbon or derivative thereof having a linear, branched, and/or cyclic chain, a dimer thereof, a trimer thereof, or mixtures thereof based upon the total weight of the composition. In one very preferred embodiment, the rosin-containing composition may contain less than or equal to about 4 wt % saturated or unsaturated, monocarboxylic aliphatic hydrocarbon or derivative thereof having a linear, branched, and/or cyclic chain, a dimer thereof, a trimer thereof, or mixtures thereof based upon the total weight of the composition.

The amount of saturated or unsaturated, monocarboxylic aliphatic hydrocarbon or derivative thereof having a linear, branched, and/or cyclic chain, a dimer thereof, a trimer thereof, or mixtures thereof present in the rosin-containing composition may be 0.1, 0.2, 0.3, 0.5, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10.0, and 10.0 wt % based upon the total weight of the composition, including any and all ranges and subranges therein.

The saturated or unsaturated, monocarboxylic aliphatic hydrocarbon or derivative thereof having a linear, branched, and/or cyclic chain, a dimer thereof, a trimer thereof, may be any one or more found in biomass products, such as those similar to black liquor solids, soaps, skimmings, as well as tall oil products such as pitch and/or distillate products such as tall oil fatty acid, distilled tall oil, crude tall oil, and monomer.

The saturated or unsaturated, monocarboxylic aliphatic hydrocarbon is a fatty acid. Examples of such include oleic, linoliec and/or stearic acids, including a derivative thereof; a linear, branched, and/or cyclic isomer thereof; a dimer thereof, and/or a trimer thereof.

The saturated or unsaturated, monocarboxylic aliphatic hydrocarbon or derivative thereof having a linear, branched, and/or cyclic chain, a dimer thereof, a trimer thereof, may be an acid having linear, branched, and/or cyclic $C_{18}$ chain. Examples of such may include linoliec and/or oleic acids or derivative thereof. Further examples may be linear, branched, and/or cyclic isomers of linoliec and/or oleic acids.

Examples of the saturated or unsaturated, monocarboxylic aliphatic hydrocarbon or derivative thereof having a linear, branched, and/or cyclic chain, a dimer thereof, a trimer thereof may be those found and described, for example in U.S. Pat. Nos. 6,875,842; 6,846,941; 6,344,573; 6,414,111; 4,519,952; and 6,623,554, which are hereby incorporated, in their entirety, herein by reference.

Finally, examples of the saturated or unsaturated, monocarboxylic aliphatic hydrocarbon or derivative thereof having a linear, branched, and/or cyclic chain, a dimer thereof, a trimer thereof may be caproic, enthanic, caprylic, capric, isodecyl, pelargonic, lauric, myristic, palmitic, oleic, linoleic, linolenic, stearic, isostearic, behenic, arachidic, arachidonic, erucic, azelaic, coconut, soya, tall oil, tallow, lard, neatsfoot, apricot, wheat germ, corn oil, cotton seed oil, ricinic, ricinoleic, rapeseed, palm kernel fatty acids, dimer acids, trimer acids, ozone acids, diacids, triacids, combinations and mixtures of these.

The rosin acid-containing composition has any acid value. Preferably, the composition has an acid value that include those values less than 200, preferably less than 190, more preferably less than 180, most preferably less than 170. The acid value of the rosin acid containing composition may be 10, 11, 12, 13, 14, 15, 20, 25, 30, 35, 40, 45, 50, 55, 60, 65, 70, 75, 80, 85, 90, 95, 100, 105, 110, 120, 125, 130, 140, 150, 155, 160, 165, 170, 175, 180, 185, 190, 195 and 200, including any and all ranges and subranges therebetween. Preferably, the acid value is from 10 to 165, although it may be any acid value mentioned above, including any and all ranges and subranges therebetween.

As mentioned above, the rosin acid ester of the present invention is a reaction product, in part, of at least one rosin acid-containing composition with an $\alpha,\beta$-unsaturated carboxyl compounds or ester thereof. An $\alpha,\beta$-unsaturated carboxyl compound has an olefinic unsaturation adjacent to the carbon atom of a carboxyl group, i.e., has the —C=C—C(=O)—O— arrangement of carbon and oxygen atoms. The $\alpha,\beta$-unsaturated carboxyl compound is reactive with rosin acid to form an adduct therebetween. When the $\alpha,\beta$-unsaturated carboxyl compound is maleic anhydride, the adduct between rosin and maleic acid is known as maleated rosin. When the $\alpha,\beta$-unsaturated carboxyl compound is fumaric acid, or an ester of fumaric acid, then the corresponding adduct formed between rosin and fumaric acid or a fumarate is known as fumarated rosin.

Suitable $\alpha,\beta$-unsaturated carboxylic compounds include maleic anhydride, fumaric acid, mono($C_1$-$C_{12}$ alkyl)ester of fumaric acid, di($C_1$-$C_{12}$ alkyl)ester of fumaric acid, acrylic acid, $C_1$-$C_{12}$ alkyl ester of acrylic acid, methacrylic acid, $C_1$-$C_{12}$ alkyl ester of methacrylic acid, itaconic acid, and $C_1$-$C_{12}$ alkyl ester of itaconic acid. Maleic anhydride, fumaric acid and esters of fumaric acid are preferred $\alpha,\beta$-unsaturated carboxylic compounds, with fumaric acid and esters of fumaric acid being most preferred.

As mentioned above, the rosin acid ester of the present invention is a reaction product, in part, of at least one rosin acid-containing composition with an $\alpha,\beta$-unsaturated carboxyl compounds or ester thereof to form an intermediate composition that is and/or contains an adduct therebetween. The intermediate composition and/or adduct is then reacted with an alcohol-containing composition to form the composition of the present invention which may be or contain at least one rosin acid ester of the present invention.

The alcohol-containing composition may be any alcohol-containing composition. Preferably, the alcohol-containing composition is and/or contains any at least one polyhydric alcohol. Polyhydric alcohols of the present invention are reactive with acidic moieties via standard esterification reactions, and are reactive with ester moieties via standard transesterification reactions, to produce crosslinked resinous adducts. Exemplary polyols include, without limitation, alkylene glycol (such as ethylene glycol and propylene glycol), polyalkylene glycol (such as polyethylene glycol and polypropylene glycol), alkylene triol (such as glycerol, trimethylolethane, and trimethylolpropane), tetrafunctional alcohols such as pentaerythritol, pentafunctional alcohols such as dimerized trimethylolpropane, or hexafunctional alcohols such as dimerized pentaerythritol, where a preferred polyol of the present invention is polyethylene glycol.

When the alcohol-containing composition is and/or contains at least one polyethylene glycol and/or polyol, preferably the at least one polyethylene glycol (PEG) and/or polyol has a weight average or number average molecular weight of that is less than 5000, more preferably less than 2000, most preferably less than 1000. The weight average or number average molecular weight of the polyethylene glycol and/or polyol is less than 5000, 4000, 3000, 2000, 1000, 900, 800, 700, 600, 500, 400, 300, 200, and 100. The most preferred polyol is a polyethylene glycol having a number or weight average molecular weight that is about 400 (e.g. PEG-400).

The rosin acid ester of the present invention may have any acid value. Such preferred acid values include those greater than 10 and those less than or equal to 200. Preferably, the acid value of the rosin acid ester of the present invention is not greater than 150, more preferably not greater than 100, most preferably not greater than 50. The acid value of the rosin acid ester of the present invention may be 1, 2, 3, 4, 5, 6, 7, 8, 9, 10, 11, 12, 13, 14, 15, 20, 25, 30, 35, 40, 45, 46, 47, 48, 49, 50, 55, 60, 65, 70, 75, 80, 85, 90, 95, 100, 105, 110, 120, 125, 130, 140, 150, 160, 170, 180, 190, and 200, including any and all ranges and subranges therebetween. Preferably, the acid value is from 1 to 50 although it may be any acid value mentioned above, including any and all ranges and subranges therebetween.

In addition, the rosin acid ester of the present invention is soluble in water. Preferably, the rosin acid ester is 100% soluble in water. The rosin acid ester may be from 50 to 100 wt % soluble in water so long as it contains all of the physical and performance characteristics (when used in oil containing compositions, preferably metal working compositions) as described herein.

In addition, the rosin acid ester of the present invention has any saponification number. Preferably, the saponification number is from 25 to 200, more preferably from 50 to 150, most preferably from 75 to 125.

Also, the rosin acid ester of the present invention has any hydroxyl value. Preferably, the hydroxyl value is from 25 to 150, more preferably from 40 to 120, most preferably from 50 to 100.

In addition, the rosin acid ester of the present invention has any pour point. Preferably, the pour point is less than or equal to 25° C., more preferably less than or equal to 10° C., most preferably less than or equal to 0° C. Of course, the pour point along with other cold flow improvement characteristics may be depressed by the use of pour point depressants commonly known in the art and mentioned above.

Still further, the rosin acid ester of the present invention has an average particle diameter as measured by a Beckman Coulter LS230 particle size analyzer running Window's based "LS" software from Beckman Coulter version 3.29 of from 0.04 to 0.2 microns, preferably from 0.07 to 0.17 microns, more preferably from 0.08 to 0.16 microns, and most preferably from 0.09 to 0.15 microns. The average particle diameter may be 00.4, 0.05, 0.06, 0.07, 0.08, 0.09, 0.11, 0.12, 0.13, 0.14, 0.15, 0.16, 0.17, 0.18, 0.19, and 0.2 microns, including any and all ranges and subranges therein.

Still even further, the rosin acid ester of the present invention has a kinematic viscosity (in centiStokes), as measured using Cannon Fenske viscosity tubes (according to standard ASTM D445) immersed in constant temperature baths at 100° C., at 40° C., and at 25° C. of from 250 to 650 centiStokes, from 4500 to 6000 centiStokes, and from 10000 to 15000 centiStokes, respectively, including any and all ranges and subranges therein. More preferably in constant temperature baths at 100° C., at 40° C., and at 25° C., the viscosity of the resin acid ester of the present invention is from 400 to 500 centiStokes, from 5000 to 5500 centiStokes, and from 12000 to 13000 centiStokes, respectively, including any and all ranges and subranges therein.

As mentioned above, the rosin acid ester and/or composition of the present invention may be made by a two-reaction process, although both reactions may be performed simultaneously in one step and/or serially in multiple steps. In the first reaction, at least one rosin acid-containing composition is reacted with at least one $\alpha,\beta$-unsaturated carboxylic acid or ester thereof to form an intermediate composition containing an adduct therebetween rosin acid and $\alpha,\beta$-unsaturated carboxylic acid or ester thereof. Subsequently, the intermediate composition containing the adduct is reacted with an alcohol-containing compound to produce the composition of the present invention. The resultant ester-containing composition is and/or contains at least one rosin acid ester of the present invention.

In the first reaction, an adduct is formed between the rosin acid-containing compound and the $\alpha,\beta$-unsaturated carboxylic acid or ester thereof. The above-mentioned intermediate composition contains this adduct. The reaction is performed so as to complete a Diels Alder reaction between the rosin acid-containing composition and the $\alpha,\beta$-unsaturated carboxylic acid or ester thereof. Preferably, the reaction is performed at elevated temperature. More preferably, the temperature of the reaction is about 200° C., of from 180° C. to 205° C. The reaction time may be any. However, the preferable reaction time may be from 30 minutes to 90 minutes, more preferably from 45 minutes to 75 minutes including any and all ranges and subranges therein. The rosin acid-containing composition is preferably melted prior to the addition of the $\alpha,\beta$-unsaturated carboxylic acid or ester thereof. The resultant intermediate composition containing the adduct between the rosin acid-containing compound and the $\alpha,\beta$-unsaturated carboxylic acid or ester thereof is then cooled.

In various aspects of the present invention, the intermediate composition comprises reaction product so that about from 1 to 25 wt %, from 2 to 25 wt %, or from 3 to 25 wt %; or from about 1 to 20 wt %, from 2 to 20 wt %, or from 3 to 20 wt %; or from about 1 to 15 wt %, from 2 to 15 wt %, or from 3 to 15 wt % $\alpha,\beta$-unsaturated carboxylic acid or ester thereof. In the most preferred, embodiment, the $\alpha,\beta$-unsaturated carboxylic acid or ester thereof is fumaric acid or an ester thereof to create a fumarated rosin acid. The above-mentioned intermediate composition contains at least one fumarated rosin acid.

For the second reaction, the adduct or the intermediate composition containing the adduct may be contacted with the alcohol-containing composition in any amounts and any conditions necessary to make the rosin acid ester of the present invention. The adduct or the intermediate composition containing the adduct may be contacted with the alcohol-containing composition so as to undergo an esterification and/or a transesterification.

The rosin acid ester of the present invention may be made by contacting at least about not less than 25 wt %, preferably not less than about 40 wt %, more preferably not less than about 50 wt %, most preferably not less than about 52 wt % of the alcohol-containing compound with not more than about 75 wt %, preferably not more than about 60 wt %, more preferably not more than about 50 wt %, most preferably not more than about 48 wt % of the adduct between the rosin acid compound and the $\alpha,\beta$-unsaturated carboxylic acid or ester thereof. More specifically, the amount of alcohol-containing compound added to the reaction may be not less than about 25, 30, 35, 40, 45, 46, 47, 48, 49, 50, 51, 52, 53, 54, 55, 60, 65, 70, 75, 80, 85, 90, and 95 wt %, based upon the total weight of the alcohol-containing compound and the adduct between the rosin acid compound and the $\alpha,\beta$-unsaturated carboxylic acid or ester thereof, including any and all ranges and subranges therein. In addition thereto, the amount of adduct between the rosin acid compound and the $\alpha,\beta$-unsaturated carboxylic acid or ester thereof added to the reaction may be not more than about 5, 6, 7, 8, 9, 10, 15, 20, 25, 30, 35, 40, 45, 46, 47, 48, 48, 49, 50, 51, 52, 53, 54, 55, 60, 65, 70, and 75 wt %, based upon the total weight of the alcohol-containing compound and the adduct between the rosin acid compound and the $\alpha,\beta$-unsaturated carboxylic acid or ester thereof, including any and all ranges and subranges therein.

To increase the rate of the esterification and/or transesterification reaction, a catalyst for esterification reactions may be included in the reactant mixture. Esterification/Transesterification catalysts are well known in the art and include sulfuric acid, phosphoric acid and other inorganic acids, metal hydroxides and, alkoxides such as tin oxide, magnesium oxide (MgO) and titanium isopropoxide, and divalent metal salts such as tin or zinc salts. Preferably, the catalyst is magnesium oxide (MgO). When a catalyst is present, it should be used in small amounts, e.g., less than about 5 weight percent of the total mass of the reaction mixture, preferably less than about 2% and more preferably less than about 1% of the total mass of the reaction mixture. The catalyst may be present in an amount that is from 0.05 to 0.8, preferably from 0.07 to 0.6, most preferably from 0.09 to 0.4 weight percent of the total mass of the reaction mixture. Excessive amounts of catalyst increase the cost of preparing the rosin acid ester, as well as often leave behind residue that may be harmful to the environment in which the ester is located.

The adduct between the rosin acid compound and the α,β-unsaturated carboxylic acid or ester thereof, the alcohol-containing compound, and the catalyst may be added together simultaneously or serially. Preferably, the reaction is carried out at elevated temperature. Most preferably, the temperature of the reaction is from 230 to 290° C., preferably from 240 to 280° C., more preferably from 250 to 270° C., most preferably from 255 to 265° C., including any and all ranges and subranges therebetween.

Preferably, the rosin-containing composition is any rosin-containing composition commercially available from Arizona Chemical Company, such as for example, Sylvaros NCY. Preferably, the adduct between the rosin acid compound and the α,β-unsaturated carboxylic acid or ester thereof is made by contacting, preferably under Diels Alder conditions, Sylvaros NCY with fumaric acid to produce an intermediate composition containing the adduct referred to herein as a fumarated rosin acid. Examples of fumarated rosin acids are those available from Arizona Chemical Company such as for example Sylvaprint 8250. In another preferred embodiment, the fumarated rosin ester is contacted with the alcohol-containing compound, most preferably polyethylene glycol (e.g. PEG-400), preferably under esterification and/or transesterfication conditions so as to produce a specifically embodied rosin acid ester of the present invention.

In an alternative embodiment, the rosin acid ester may further be hydrogenated, either fully and/or partially. The optionally hydrogenated rosin acid ester may also be utilized as the rosin acid ester as described herein, preferably as a lubricant in oil-containing compositions such as metal working compositions.

Once the rosin acid ester and/or the composition containing the rosin acid ester of the present invention is made, it is very useful in many capacities. Preferably, the rosin acid ester is useful as a lubricant for use in any oil-containing composition. More preferably, the oil-containing composition is a metal working composition. The metal working composition may be synthetic, semi-synthetic, and/or soluble oil and may be fluids used for cutting, grinding, and stamping metals.

The rosin acid ester of the present invention are preferably used to improve the load carrying characteristics of lubricating fluids used in metal working fluids where a primary function of the metal working fluid is to provide lubricity between the metal being worked and the machine tool. Lubricating base fluids used as metal working fluids include but are not limited to mineral oil, esters and polyalkylene glycols. A typical metal working formulation may be as follows: Mineral Oil 68%; Sulfonate 14%; Distilled tall oil 4%; Trietbanolamine 2.5%; Ethoxylated Castor Oil 6.5%; Emulsifier 2.5%; and lubricant 3%.

The synthetic, semi-synthetic, and/or soluble metal working oil compositions may contain at least one oil, castor oil, mineral oil, pH buffer, extreme pressure lubricant, extreme pressure additive, bonding lubricant, boundary lubricant, corrosion inhibitor (rust inhibitor), coupler, fungicide/biocide, emulsifier, primary emulsifier, co-emulsifier, and diluent. These include, but are not limited to, Sulfated castor oil—a boundary lubricant, Actracor 4000—a rust inhibitor, Triethanolamine—a pH buffer, Actrafos 110A—an extreme pressure additive, Sulfonate—a rust inhibitor and a emulsifier, Distilled Tall Oil—a co-emulsifier, Ethox TO-8—a emulsifier, Ethox GMO—a co-emulsifier, and Ethox CO-36—a boundary lubricant. Preferably, the diluent is water.

In addition to the rosin acid ester of the present invention, the lubricating fluid may contain one or more additives. Additives are often included in lubricating fluids, and accordingly one of ordinary skill in the art is well aware of such additives that include but are not limited to antiwear agents, extreme pressure agents, antioxidants, antirust agents, and defoamers. These additives may be included in lubricating fluid formulations of the present invention in their usual amounts, i.e., the amounts in which they are used in compositions that do not include the rosin acid ester of the present invention, where these additives will provide their usual properties.

Exemplary additives include:

Imidazolines, such as 2-methylimidazoline, and polyalkyl amines, such as are disclosed in U.S. Pat. No. 4,713,188;

Polyisobutylene having a number average molecular weight from 400 to 2500, preferably about 950. Polyisobutylene acts to improve lubricity and anti-scuff activity of the lubricant;

Functionalized polyisobutylene having a number average molecular weight from 400 to 2500, preferably about 1300. The functional group for the olefin is typically amine based. This functionalized polyisobutylene is present in an amount up to 15% by weight, preferably up to 10%, more preferably about 5%, by weight. The functionalized polyisobutylene is therefore, a reaction product of the olefin and olefin polymers with amines (mono- or-polyamines). The functionalized polyisobutylene provides superior detergency performance, particularly in two-stroke cycle engines;

Auxiliary extreme pressure agents and corrosion and oxidation inhibiting agents such as a chlorinated aliphatic hydrocarbon, e.g., chlorinated wax and chlorinated aromatic compounds; organic sulfides and polysulfides; sulfurized alkylphenol; phosphosulfurized hydrocarbons; phosphorus esters; including principally dihydrocarbon and trihydrocarbon phosphites, and metal thiocarbamates. Many of these auxiliary extreme pressure agents and corrosion oxidation inhibitors also serve as antiwear agents. Zinc dialkylphosphorodithioates are a well known example;

Pour point depressants, which serve to improve low temperature properties of lubricating fluid based compositions. Examples of useful pour point depressants are polyamides, polymethacrylates; polyacrylates; polyacrylamides; condensation products of haloparaffin waxes and aromatic compounds; vinyl carboxylate polymers; and terpolymers of dialkylfumarates, vinyl esters of fatty acids and alkyl vinyl ethers. Pour point depressants useful for the purposes of this invention, techniques for their preparation and their uses are described in U.S. Pat. Nos. 2,387,501; 2,015,748; 2,655, 479; 1,815,022; 2,191,498; 2,666,746; 2,721,877; 2,721,878; and 3,250,715; and Anti foam agents, which function to reduce or prevent the formation of stable foam. Typical anti foam agents include silicones or organic polymers.

While the rosin acid ester is preferably a lubricant in metal working compositions, the rosin acid ester of the present invention may also be used in combination with any other oil where it is desired to improve the load carrying properties of the oil. Such oils include, without limitation, automatic transmission fluid (ATF), cylinder lubricant, crankcase lubricating oil, functional fluid, such as a power transmission fluid where an exemplary power transmission fluid is hydraulic fluid and hydraulic oil, tractor oil, gear oil, and engine oil. In these oils, the rosin acid ester of the present invention may be present in the composition at an amount effective to improve the load carrying characteristics of the composition.

An example of a soluble oil metal working formulation is as follows:
Soluble Oil
Mineral Oil: 67%
Sodium Sulfonate: 14%
Lubricity Agent: 13%
Coemulsifier (DTO): 4%
Coemulsifier: 2%

An example of a synthetic oil metal working formulation is as follows:
Synthetic Fluid
Water: 70%
Rust Inhibitor: 10%
pH Buffer: 5%
Extreme Pressure lubricant 4%
Boundary lubricant 1: 5%
Boundary lubricant 2: 4%
Fungicide: 2%

Of course, any of the other additional additives mentioned could be added to either of the above-mentioned example formulations in their effective amounts. In both of the above-mentioned formulations, the lubricity agent is preferably the rosin acid ester of the present invention and/or a composition containing the rosin acid ester of the present invention.

The rosin acid ester of the present invention may be added to an oil containing composition, such as a metal working composition/formulation, at any wt % or it may replace any one of the above conventional components of the oil-containing composition, especially the components of metal working fluids. Preferably, the amount of rosin acid ester added is such to increase the end composition's load carrying property as compared to that of the same composition when not containing the rosin acid ester of the present invention. The amount of the rosin acid ester added may be any amount. In general, it is preferable to be present in an amount that is not greater than 50 wt %, preferably not greater than 30 wt %, based upon the total weight of the composition. Further, the amount of rosin acid ester may range from 1 to 30 wt %, preferably from 3 to 15 wt %, based upon the total weight of the composition. The amount of the rosin acid ester of the present invention that may be present in the oil-containing composition, preferably a metal working composition, may be 1, 2, 3, 4, 5, 6, 6, 7, 8, 9, 10, 11, 12, 13, 14, 15, 16, 17, 18, 19, 20, 22, 24, 26, 28, 30, 35, 40, 45, and 50 wt %, based upon the total weight of the composition, including any and all ranges and subranges therein.

The present invention is explained in more detail with the aid of the following embodiment examples.

EXAMPLES

Example 1

Production of the Rosin Acid Ester #1 of the Present Invention (U398)

Fumarated rosin ester, i.e. Sylvaprint 8250 was contacted with PEG-400 at 260° C. in the presence of a magnesium oxide catalyst at an amount ranging from 0.1 to 0.3 wt % based upon the total mass of the reaction mixture. A trap was added to collect water from the reaction. The reaction was monitored by the acid value and stopped (i.e. cooled) once the desired acid value (i.e. ~10) was reached.

Example 2

Production of Oil-Containing Compositions

The following oil-containing compositions were made, preferably as metal working compositions.

| Synthetic Metal Working Oil Formulation** | |
|---|---|
| Sulfated castor oil | 4 wt % Boundary lubricant |
| Actrafos 4000 | 10 wt % Rust inhibitor |
| Triethanolamine | 5 wt % pH buffer and inhibitor |
| Acratafos 110A | 4 wt % Extreme pressure additive |
| Lubricity Agent* | 5 wt % |
| Water | 72 wt % |

*note that the lubricity agent may be rosin acid ester #1 (i.e. U398), commercially available Uniflex 397 available from Arizona Chemical Company (U397), or conventional lubricity agents.
**note that the "partially formulated synthetic metalworking fluid" is simply 10 wt % of the Lubricity Agent* in water.

| Semisynthetic Metalworking Fluid Formulation | |
|---|---|
| Lubricity Agent* | 25 wt % |
| Mineral Oil | 25 wt % |
| Actracor 4000 | 10 wt % |
| Water | 40 wt % |

*note that the lubricity agent may be rosin acid ester #1 (i.e. U398), commercially available Uniflex 397 available from Arizona Chemical Company (U397), or conventional lubricity agents.

| Soluble Oil Metalworking Concentrate Formulation**,*** | |
|---|---|
| Mineral Oil | 71.5 wt % |
| Sulfonate | 7 wt % rust inhibitor and emulsifier |
| Distilled Tall Oil | 4 wt % co-emulsifier |
| Triethanolamine | 2 wt % |
| Ethox TO-8 | 2.5 wt % emulsifier |
| Ethox GMO | 3 wt % co-emulsifier |
| Ethox CO-36 | 4 wt % Boundary lubricants |
| Lubricity Agent* | 6 wt % |

*note that the lubricity agent may be rosin acid ester #1 (i.e. U398), commercially available Uniflex 397 available from Arizona Chemical Company (U397), or conventional lubricity agents.
**note that the "partially formulated soluble oil metal working fluid" is simply the same as the above formulation, except the Ethox GMO are removed and are replaced by water.
*The above formulation and "partially formulated soluble oil metal working fluid" formulation are concentrates and were added to the water diluted to 7 wt %.

**note that the "partially formulated soluble oil metalworking fluid" is simply the same as the above formulation, except the EthoxTO-8 and Ethox GMO are removed and are replaced by water.

*The above formulation and "partially formulated soluble oil metal working fluid" formulation are concentrates and were added to water and diluted to 7 wt %.

Example 3

Testing the Load Carrying Properties of the Rosin Acid Ester when Utilized in Fully Formulated and/or Partially Formulated Oil-Containing Compositions The above-mentioned Lubricity Agents, especially inventive example 1 (U398), and commercially available products were tested for their load carrying properties when added to the above-mentioned oil-containing composition: Synthetic Metal Working Oil Formulation; Partially Formulated Synthetic Metal Working Oil Formulation, Soluble Oil Metalworking Formulation, Partially Formulated Soluble Oil Metalworking Formulation; and Semi synthetic Metalworking Fluid Formulation.

The load carrying properties were measured at different torques using ASTM D 3233-93 (Reapproved 2003) Standard (see attached) to determine the load at failure (lb f) of each formulation at each torque, respectively. The results are summarized in FIGS. 1-5.

Example 4

Measuring Particle Size of Inventive Rosin Acid Ester

Figure 1:
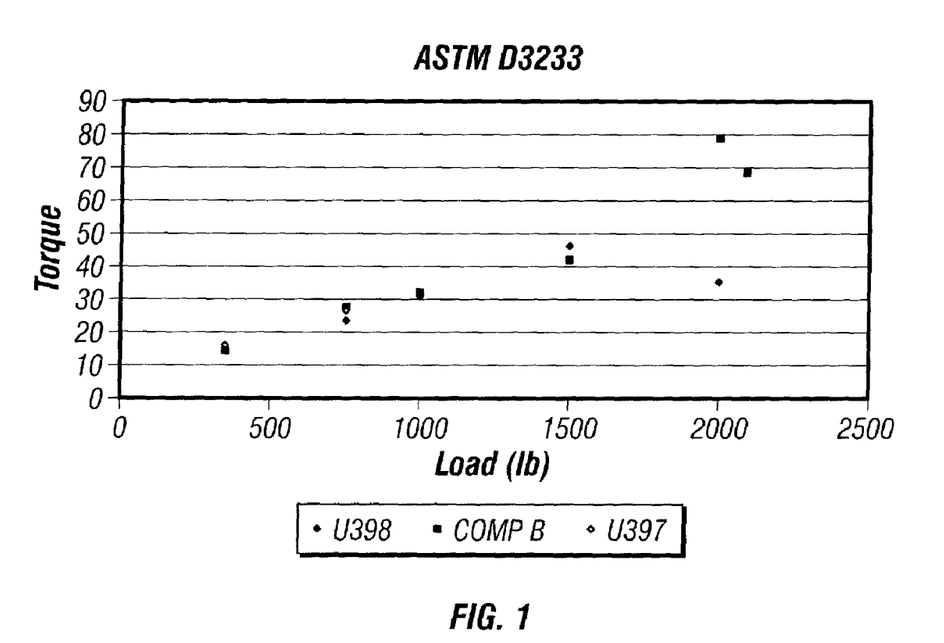
FIGS. 1-5 are plots of load carrying properties measured at different torques using ASTM D 3233-93 (Reapproved 2003) Standard to determine the load at failure (lb f) of each formulation at each torque, respectively.
Figure 2:
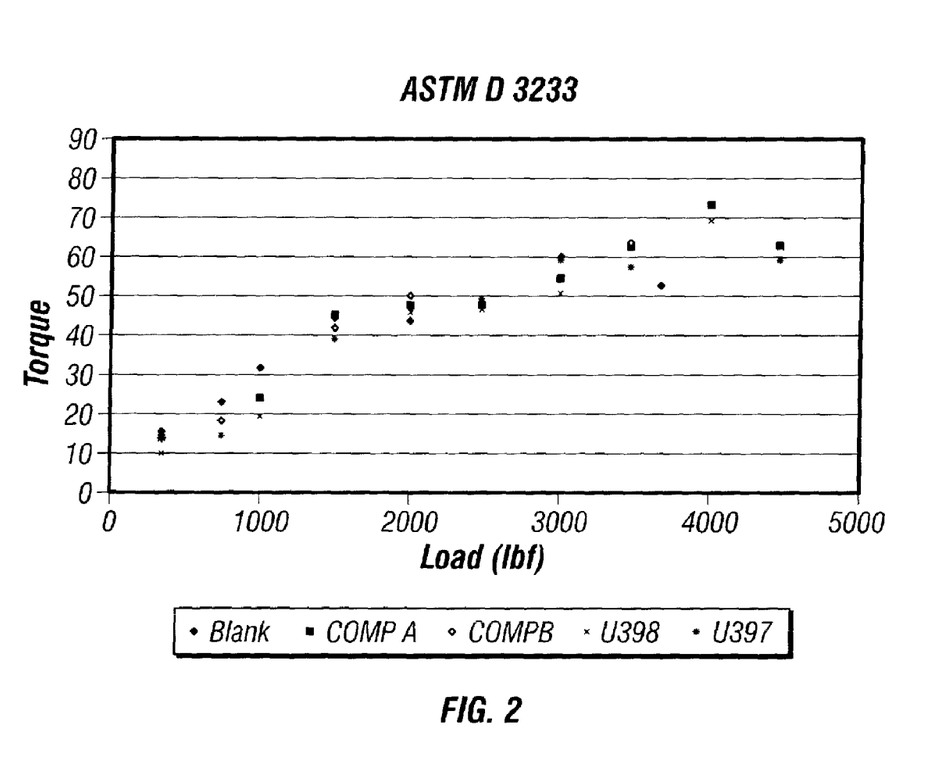
Figure 3:
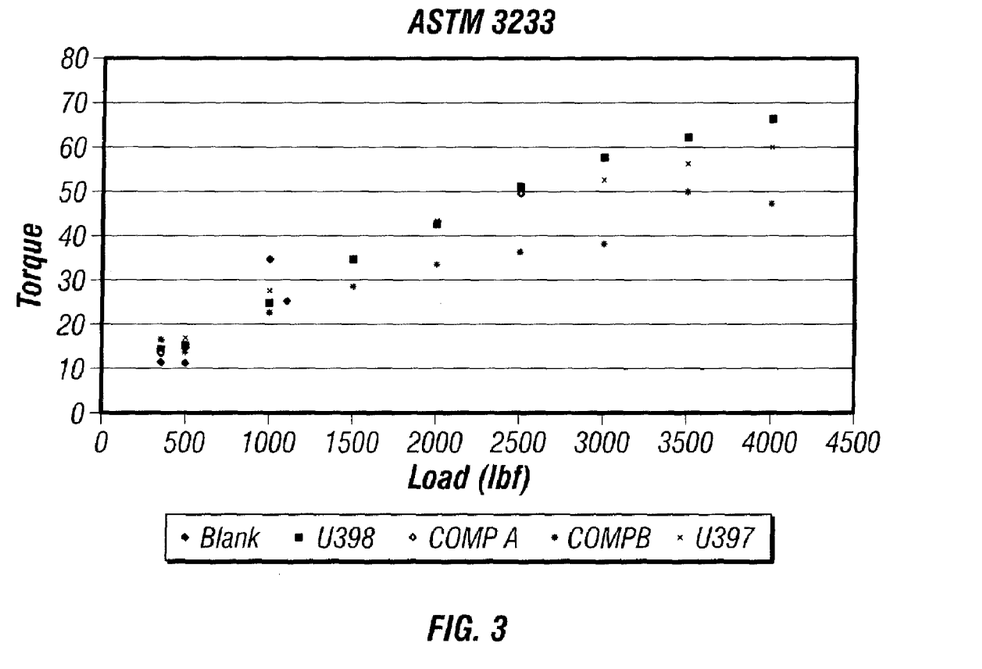
Figure 4:
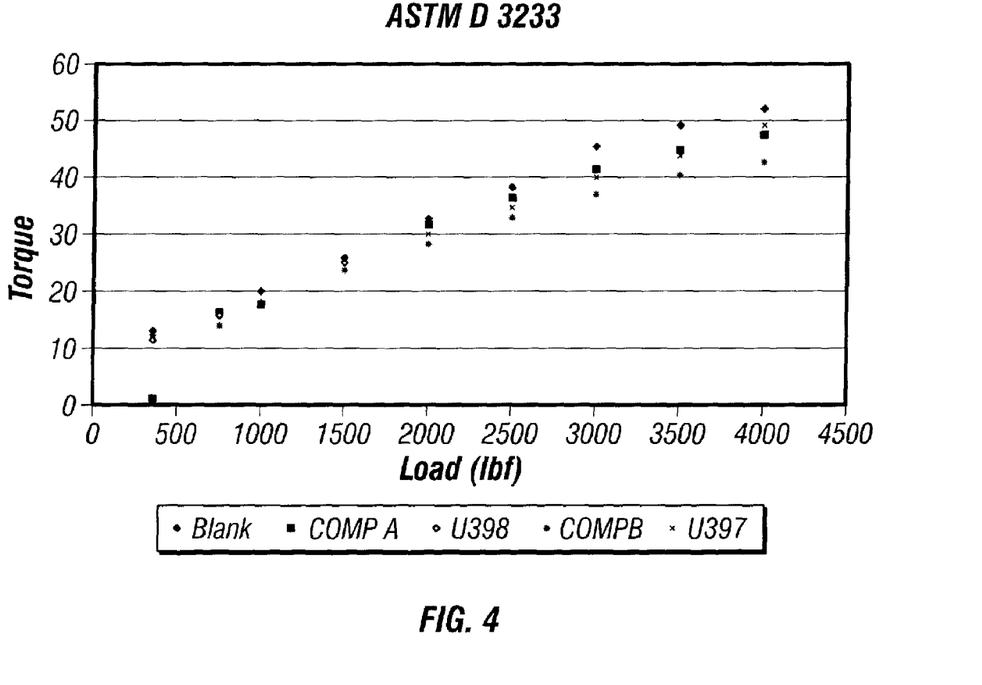
Figure 5:
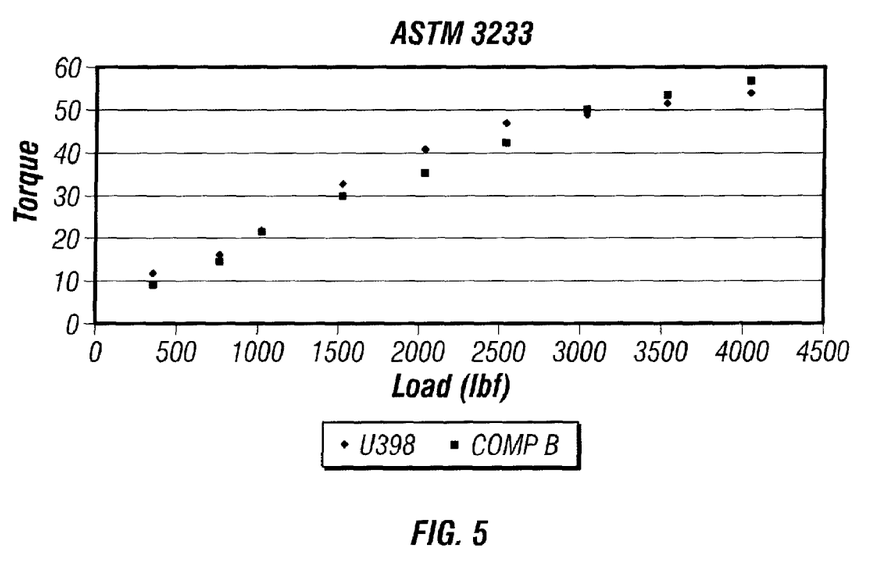
Figure 6:
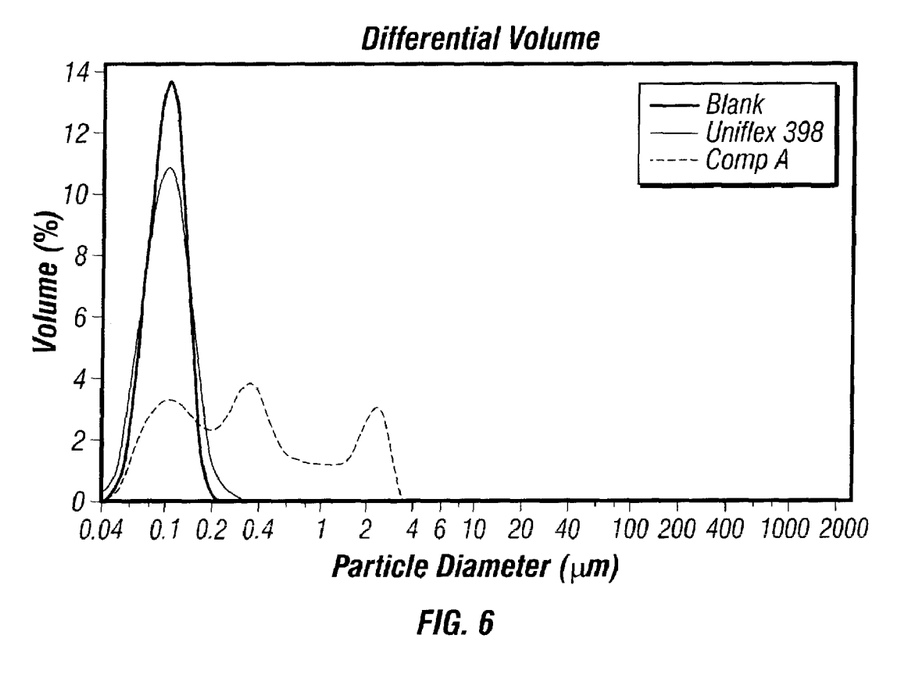
FIG. 6 is a plot of particle diameter versus volume.

The particle diameter of the rosin acid ester # 1 (U398) from Example 1 above of the present invention was measured by a Beckman Coulter LS230 particle size analyzer running Window's based "LS" software from Beckman Coulter version 3.29. The results can be found in FIG. 6.

As used throughout, ranges are used as a short hand for describing each and every value that is within the range, including all subranges therein.

Numerous modifications and variations on the present invention are possible in light of the above teachings. It is, therefore, to be understood that within the scope of the accompanying claims, the invention may be practiced otherwise than as specifically described herein.

All of the references, as well as their cited references, cited herein are hereby incorporated by reference with respect to relative portions related to the subject matter of the present invention and all of its embodiments

We claim:

1. A metal working fluid comprising:
   a lubricity agent;
   an oil;
   water; and
   a rosin acid ester that is a reaction product of contacting at least one rosin-containing composition with at least one $\alpha,\beta$-unsaturated carboxylic acid or ester thereof to form an adduct thereof and at least one alcohol-containing compound to produce the rosin acid ester, wherein the rosin acid ester has an acid value of less than or equal to 50,
   wherein the rosin-containing composition comprises at least 40 weight percent of a rosin acid compound based on the weight of the rosin-containing composition, and wherein the rosin acid ester is soluble in at least 20 weight percent of water based on the weight of the rosin acid ester.

2. A process of preparing a metal working fluid comprising;
   mixing together:
   a lubricity agent;
   at least one oil;
   water; and
   a rosin acid ester,
   wherein the rosin acid ester is prepared by the process of:
   contacting not more than 48 wt % of an adduct that is the reaction product of a rosin compound with an $\alpha,\beta$-unsaturated carboxylic acid, with at least 52 wt % of an alcohol-containing compound to produce the rosin acid ester having an acid value that is not greater than 50;
   wherein the weight percent of adduct and alcohol-containing compound is based on the total weight of adduct and alcohol containing alcohol-containing compound, and
   wherein the rosin compound comprises at least 40 weight percent rosin acid, and
   wherein the rosin acid ester is soluble in at least 20 weight percent of water based on the weight of the rosin acid ester.

3. The metal working fluid of claim 1, wherein the lubricity agent comprises a hydrocarbon.

4. The metal working fluid of claim 3, wherein the lubricity agent comprises the rosin acid ester.

5. The metal working fluid of claim 1, wherein the portion of the adduct is not more than 48 wt. % and the portion of the alcohol-containing composition is at least 52 wt. % based upon the total weight of the adduct and the alcohol-containing composition.

6. The metal working fluid of claim 5, wherein the alcohol-containing compound is a polyhydric alcohol.

7. The metal working fluid of claim 5, wherein the alcohol-containing compound is a polyethylene glycol.

8. The metal working fluid of claim 5, wherein the alcohol containing compound is a polyethylene glycol and has a weight average molecular weight of not more than 5000.

9. The metal working fluid of claim 5, wherein the alcohol-containing compound is a polyethylene glycol and has a number average molecular weight of not more than 1000.

10. The metal working fluid of claim 1, wherein the rosin acid ester comprises 50 wt. % of the metal working fluid.

11. The method of claim 2 wherein the lubricity agent comprises a hydrocarbon.

12. The method of claim 11, wherein the lubricity agent comprises the rosin acid ester.

13. The method of claim 2, wherein the portion of the adduct is not more than 48 wt. % and the portion of the alcohol-containing composition is at least 52 wt. % based upon the total weight of the adduct and the alcohol-containing composition.

14. The method of claim 13, wherein the alcohol-containing compound is a polyhydric alcohol.

15. The method of claim 13, wherein the alcohol-containing compound is a polyethylene glycol.

16. The method of claim 13, wherein the alcohol containing compound is a polyethylene glycol and has a weight average molecular weight of not more than 5000.

17. The method of claim 13, wherein the alcohol-containing compound is a polyethylene glycol and has a number average molecular weight of not more than 1000.

18. The method of claim 2, wherein the rosin acid ester comprises 50 wt. % of the metal working fluid.

* * * * *